US 8,948,764 B2

(12) United States Patent
Dimou et al.

(10) Patent No.: US 8,948,764 B2
(45) Date of Patent: Feb. 3, 2015

(54) METHODS AND ARRANGEMENTS FOR MOBILITY MANAGEMENT

(75) Inventors: Konstantinos Dimou, Stockholm (SE); Muhammad Kazmi, Bromma (SE); Walter Müller, Upplands Väsby (SE); Zhiyi Xuan, Täby (SE)

(73) Assignee: Optis Wireless Technology, LLC, Plano, TX (US)

( * ) Notice: Subject to any disclaimer, the term of this patent is extended or adjusted under 35 U.S.C. 154(b) by 151 days.

(21) Appl. No.: 13/377,661

(22) PCT Filed: Nov. 27, 2009

(86) PCT No.: PCT/SE2009/051344
§ 371 (c)(1),
(2), (4) Date: Dec. 12, 2011

(87) PCT Pub. No.: WO2010/151198
PCT Pub. Date: Dec. 29, 2010

(65) Prior Publication Data
US 2012/0108252 A1     May 3, 2012

Related U.S. Application Data

(60) Provisional application No. 61/220,843, filed on Jun. 26, 2009.

(51) Int. Cl.
*H04W 36/00*     (2009.01)
*H04W 36/32*     (2009.01)

(52) U.S. Cl.
CPC .................................... *H04W 36/32* (2013.01)
USPC ........ 455/441; 455/436; 455/440; 455/67.11; 455/226.2

(58) Field of Classification Search
USPC ................... 455/436, 440, 441, 67.11, 226.2
See application file for complete search history.

(56) References Cited

U.S. PATENT DOCUMENTS

| 5,913,168 | A  | * | 6/1999 | Moreau et al. | ................. | 455/441 |
| 8,099,105 | B2 | * | 1/2012 | Morin | ........................ | 455/456.1 |
| 8,538,423 | B2 | * | 9/2013 | Huang et al. | .................. | 455/434 |

(Continued)

FOREIGN PATENT DOCUMENTS

| WO | 2005065210 A2 | 7/2005 |
| WO | 2009022686 A1 | 2/2009 |
| WO | 2010050869 A1 | 5/2010 |

OTHER PUBLICATIONS

3rd Generation Partnership Project. "Performance of Mobility State Detection Based Cell Reselection-Further Simulation Results." 3GPP TSG-RAN WG4 Meeting #48bis, Edinburgh, UK, Sep. 29-Oct. 3, 2008.

(Continued)

*Primary Examiner* — Temica M Beamer
(74) *Attorney, Agent, or Firm* — Vincent J. Allen; Stephen Y. Liu; Carstens & Cahoon, LLP

(57) ABSTRACT

The present invention relates to methods and devices for mobility management in a cellular communications system. A user equipment maintains (21) at least two sets of mobility trigger parameters. Each set of mobility trigger parameters corresponds to a predetermined user equipment speed range. The user equipment determines (22) a speed range that the speed of the user equipment falls into and selects (23), based on the determined speed range, at least one set of mobility trigger parameters to be used for performing mobility-based decisions. If the user equipment is in connected mode a network base station may select a set of mobility trigger parameters to be used for performing handover decisions based on a determined speed range of the user equipment. Advantages are that ping-pong mobility decisions may be avoided and it is sufficient to determine a range for the UE speed, which is less complicated than determining an accurate speed of the UE particularly in idle mode.

23 Claims, 2 Drawing Sheets

(56) References Cited

U.S. PATENT DOCUMENTS

| | | | |
|---|---|---|---|
| 2002/0156893 A1* | 10/2002 | Pouyoul et al. | 709/225 |
| 2008/0102835 A1 | 5/2008 | Zhao et al. | |
| 2009/0137251 A1* | 5/2009 | Ji et al. | 455/437 |
| 2009/0156210 A1* | 6/2009 | Ponce De Leon et al. | 455/436 |
| 2009/0163212 A1 | 6/2009 | Hall et al. | |
| 2010/0298001 A1* | 11/2010 | Dimou et al. | 455/441 |

OTHER PUBLICATIONS

3rd Generation Partnership Project. "Speed Dependant Reselection for E-UTRAN." 3GPP TSG-RAN WG2 Meeting #59bis, Shanghai, China, Oct. 8-12, 2007.

Ericsson, "Simulation Results for Mobility State Detection Cell Restriction", 3GPP TSG-RAN WG4 Meeting #51bis, Jun. 29-Jul. 2, 2009, Los Angeles, US.

Ericsson, "Performance of Mobility State Detection based Cell Reselection-Simulation Results With DRX Cycle 1.28 sec", 3GPP TSG-RAN WG4 Meeting #49, Nov. 10-14, 2008, Prague, Czech Republic.

Nokia et al., "Further evaluation of dual filtering and cell reselection based mobility state detection", Mar. 23-27, 2009, Seoul, South Korea.

* cited by examiner

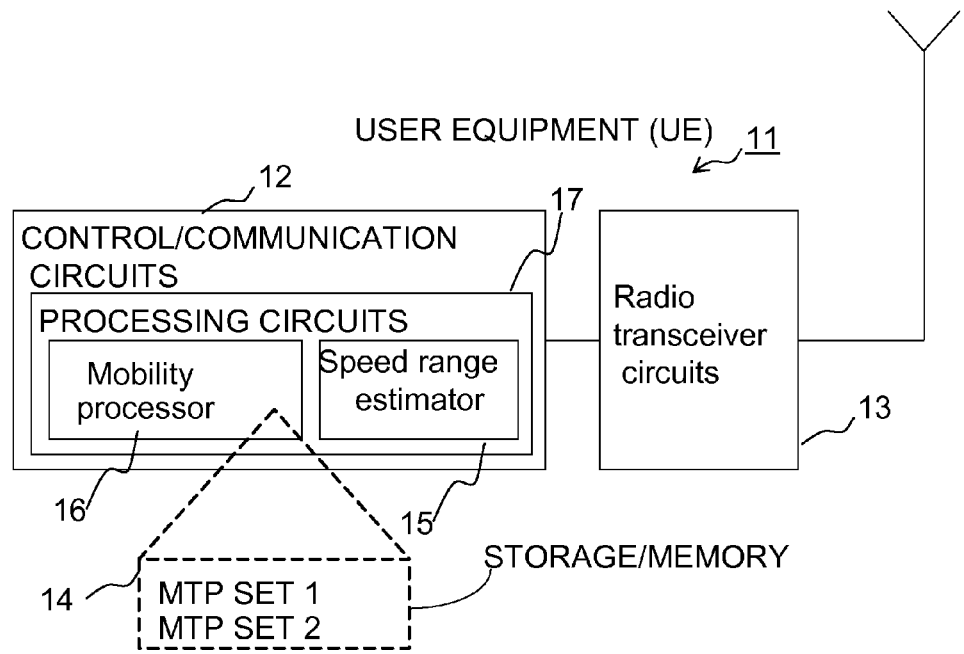
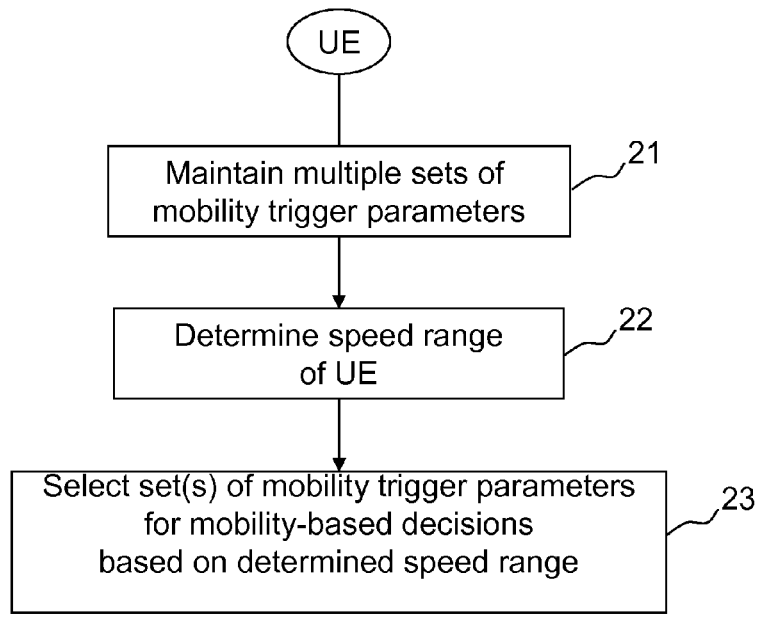

METHODS AND ARRANGEMENTS FOR MOBILITY MANAGEMENT

TECHNICAL FIELD

The present invention relates to methods and arrangements for use in cellular communications systems, and in particular to methods and arrangements for mobility management based on a determined speed range of a user equipment.

BACKGROUND

Mobility management is a challenging task in cellular communications systems. A factor having a crucial impact on the performance of mobility management schemes is the setting of mobility triggers, which is discussed in the article "Trends In Handover Design" by G. P. Pollini, published in IEEE Communications Magazine, March 1996 and in the article "Handoff in Cellular Systems" by N. D. Tripathi, J. H. Reed, and H. F. Vanlandingham, published in IEEE Personal Communications, December 1998.

There are a number of mobility triggers used in different communications systems, but the majority of systems consider two types of hysteresis as mobility triggers:
a hysteresis in signal quality; and
a time hysteresis (duration) during which the hysteresis condition related to the signal quality has to be satisfied.

The optimal set of mobility trigger depends on a number of factors. Such factors are e.g. speed of the user equipment (UE), cell size and radio propagation environment (e.g. rural or urban area).

In the 3GPP (3rd Generation Partnership Project) LTE (Long Term Evolution) system the major mobility triggers are termed HO (handover) hysteresis and Time To Trigger (TTT) for the connected mode and Qhyst and Treselection for the idle mode. In cellular communications systems according to other standards corresponding mobility triggers may be termed differently.

Studies, field measurements and experience from existing networks have shown that in order to have optimal mobility performance, there is a need to adapt the above mentioned mobility triggers as functions of UE speed, cell size and radio propagation environment. Consequently, there is a need for the UE or the network to detect that either the speed or the cell size or the radio propagation environment has changed and to update related mobility triggers accordingly. In this respect several methods of detecting UE speed either in the mobile or in the network can be found in the prior art. However existing solutions for speed detection have some drawbacks when trying to implement them in real cellular systems. Speed detection mechanisms which are based on measuring Doppler shift, are problematic due to the fact that Doppler shift is not always a good indicator of the speed in a wide range of mobility scenarios. This also increases power consumption in idle mode since the UE needs to be active for considerable duration to obtain reliable results. Other techniques for the detection of UE speed as a function of signal variations are estimated to be quite complex and quite power consuming. Thus, the implementation of these prior art methods for speed detection in commercial networks may be problematic, due to lack of accuracy and high complexity for most of them.

The 3GPP TS 36.304, "3rd Generation Partnership Project; Technical Specification Group Radio Access Network; Evolved Universal Terrestrial Radio Access (E-UTRA); User Equipment (UE) procedures in idle mode (Release 8)", version 8.6.0., published June 2009 suggests, in section 5.2.4.3, a simplified method for detecting a state of speed of a UE by counting the number of performed cell reselections or handovers within a given time window. However, it has been extensively argued that this method is vulnerable to ping-pong decisions and it requires some reaction time when conditions change. In addition, this method provides adaptation only in function of UE speed and it does not consider the other factors having an impact on the performance of mobility, such as cell size. Furthermore, the tuning of parameters so as to detect speed is quite complex. Also, speed estimation, which is based on the number of cell reselections performed, is to be done over a significantly longer duration to obtain reliable results compared with other speed estimation methods.

Within 3GPP LTE there has been discussed to use multiple sets of mobility trigger parameters configured by the network. More specifically, there has been discussed to use two sets of triggers: a 'LONG' set (long time hysteresis such as 2 seconds and small signal hysteresis such as 1 dB, or the like) and a 'SHORT' set (short time hysteresis such as 0.1 second and large signal hysteresis such as 4 dB, or the like) corresponding to low speed and high speed respectively. The scheme has been presented and its performance is assessed and compared with the performance of other schemes. The use of multiple sets of mobility triggers results in a higher number of cell changes out of which some of them cause ping-pong. This increases the signaling overhead in the system and the UE power consumption. Increase in the power consumption stems from the fact that the UE has to open its receiver for acquiring the necessary system information each time the UE changes the cell.

SUMMARY

An object of the present invention is to provide methods and arrangements that allow for improved mobility management.

The above stated object is achieved by means of methods, a user equipment and a network base station according to the independent claims.

A basic idea of embodiments of the present invention is to enable using multiple sets of mobility trigger parameters, but at the same time selecting a number of the sets that are to be used for performing mobility-based decision based on a determined speed range of the user equipment.

A first embodiment of the present invention provides a method for mobility management in a user equipment for use in a cellular communications system. The method comprises that the UE maintains at least two sets of mobility trigger parameters. Each set of mobility trigger parameters corresponds to a predetermined user equipment speed range. The method also comprises determining a speed range of the user equipment and selecting, based on the determined speed range of the user equipment, at least one set of mobility trigger parameters to be used for performing mobility-based decisions.

A second embodiment of the present invention provides a user equipment adapted for use in a cellular communications system. The user equipment comprises a maintaining unit for maintaining at least two sets of mobility trigger parameters. Each set of mobility trigger parameters corresponds to a predetermined user equipment speed range. The user equipment also comprises a speed range estimator adapted to determine a speed range of the user equipment. In addition the user equipment includes a mobility processor adapted to select, based on the determined speed range of the user equipment, at least one set of mobility trigger parameters to be used for performing mobility-based decisions.

A third embodiment of the present invention provides a method for mobility management in a network base station of a cellular communications system. The network base station is acting as serving base station of a user equipment. The method comprises maintaining at least two sets of mobility trigger parameters. Each set of mobility trigger parameters corresponds to a predetermined user equipment speed range. According to a further step of the method a speed range of the user equipment is determined. In yet a further step at least one set of mobility trigger parameters to be used for performing cell handover decisions is selected, based on the determined speed range of the user equipment.

A fourth embodiment of the present invention provides a network base station adapted for use in a cellular communications system and for acting as serving base station of a user equipment. The network base station includes a maintaining unit for maintaining at least two sets of mobility trigger parameters, wherein each set of mobility trigger parameters corresponds to a predetermined user equipment speed range. The network base station further comprises a speed range estimator adapted to determine a speed range of the user equipment. The network base station further comprises a mobility processor adapted to select, based on the determined speed range of the user equipment, at least one set of mobility trigger parameters to be used for performing cell handover decisions.

An advantage of embodiments of the present invention is that the number of ping-pongs can be reduced compared to prior art solutions using multiple sets of mobility trigger parameters. In such prior art solutions it has been observed that high number of cell changes may be generated with some of them being ping-pongs. Simulation results have shown that the problem of ping-pongs primarily occur when the user equipment is moving at high speed by triggers caused by mobility trigger parameters best suited for low speed. By means of disabling sets of mobility trigger parameters best suited for low speed when the UE is in a high speed state the number of ping-pongs may be reduced. When a set is disabled it is herein meant that it does not influence mobility-based decisions.

Other advantages of embodiments of the present invention is that they provide a simple tool for operators, they do not significantly increase the user equipment complexity and they do not involve extensive tuning of mobility trigger parameters from the operators.

A further advantage of one or more embodiments of the present invention is that simplified rough speed estimation may be used since it suffices to determine a speed range of the user equipment. This allows for detecting e.g. a high speed state easily and quickly leading to appropriate use of mobility trigger parameters most of the time. Some prior art solutions require a more accurate determination of user equipment speed which increases complexity.

Yet another advantage of one or more embodiments of the present invention is flexibility in the type of method used for speed range determination. Different suitable speed range determination methods can be applied depending on application scenario.

Further advantages and features of embodiments of the present invention will become apparent when reading the following detailed description in conjunction with the drawings.

BRIEF DESCRIPTION OF THE DRAWINGS

FIG. 1 is a schematic block diagram which illustrates a user equipment according to an embodiment of the present invention.

FIG. 2 is a flow diagram illustrating an embodiment in accordance with the present invention of a method for mobility management in a user equipment.

DETAILED DESCRIPTION

Figure 3:
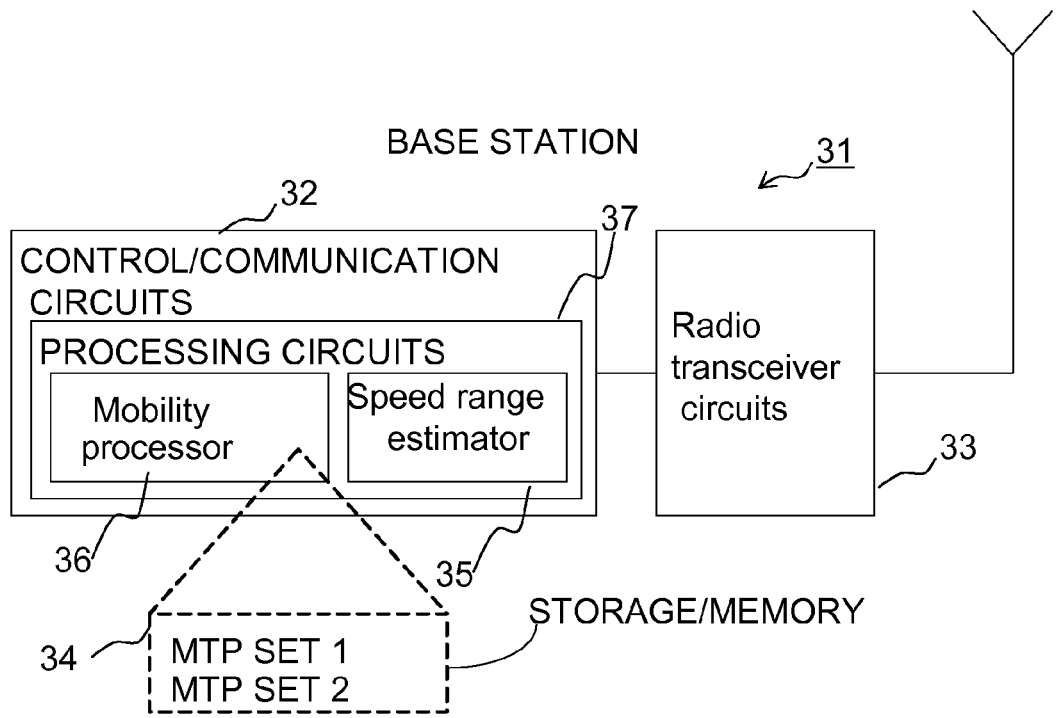
FIG. 3 is a schematic block diagram which illustrates a network base station according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

A basic idea of embodiments proposed herein is to provide multiple sets of mobility trigger parameters. Each set of mobility trigger parameters corresponds to a predetermined user equipment (UE) speed range in the sense that each set includes parameters that are deemed to be appropriate when the UE speed falls within the speed range corresponding to the set. However, all sets of mobility trigger parameters are not activated in all situations according to embodiments of the present invention. When referring to a set of mobility trigger parameters as being activated it is herein meant that the set is used for performing mobility-based decisions, i.e. when the set of mobility trigger parameters triggers they will influence a cell change decision.

As mentioned in the background section, it is a known problem that multiple parallel sets of mobility trigger parameters are sensitive to ping-pong decisions. Embodiments of the present invention avoid this by determining a speed range of the UE and selecting which sets of mobility trigger parameters to use for performing mobility-based decisions based on the determined speed range.

Depending on whether the UE is in connected mode or idle mode the mobility management may be handled by the UE, by a network base station primarily, or by the UE and the network base station in co-operation. Furthermore, there are several different alternative ways of determining the speed range of the UE as will be described in further detail below in connection with detailed descriptions of different embodiments of the present invention.

The terms "mobility-based decisions" and "mobility related decisions" are used interchangeably herein and are intended to refer to decisions regarding cell changes, which includes cell reselections in case of the UE being in idle mode and handovers in case of the UE being in connected mode.

When referring herein to a "user equipment" it is to be understood that the user equipment may be a mobile terminal, a mobile phone, a PDA, or another type of user equipment.

When referring herein to a "network base station" or "base station" it is to be understood that this term comprises e.g. a Node B in WCDMA or an eNodeB in LTE.

For the sake of simplicity it is herein referred to a "set of mobility trigger parameters". It is however to be understood that the set may comprise a single parameter or a plurality of parameters, and that the phrase "set of mobility trigger parameters" is intended to cover a set with any positive number of mobility trigger parameters.

In addition, for the sake of simplicity, detailed descriptions of embodiments are exemplified herein in the context of a 3GPP LTE system. However, this does not restrict the applicability of the embodiments of the present invention to this system.

The various sets of mobility trigger parameters to be used within a cell are generally broadcasted to the UEs in the cell, since the optimal mobility trigger parameters depend also on the cell size and radio propagation environment in addition to UE speed range. Thus the sets of mobility trigger parameters to be used by a UE may change for each cell change. Examples of entries in a set of mobility trigger parameters are parameters that may be used by the UE for making comparative measurements between cells available for reselection in idle-mode. Such parameters include a signal hysteresis parameter; a reselection time value (Treselection); a physical layer measurement period value; a higher layer filtering coefficient; and (at least for LTE embodiments) a measurement bandwidth parameter. The mobility trigger parameter sets used for connected-mode cell handover are similar, but a time-to-trigger (TTT) value may be used in place of the Treselection value. Of course, the method proposed herein should be understood to apply to other parameter types, and fewer or greater numbers of parameters within each set. In 3GPP LTE the major mobility triggers are termed HO hysteresis and Time To Trigger (TTT) for the connected mode and Qhyst and Treselection for the idle mode.

In at least one embodiment, the at least two sets of mobility trigger parameters include a high-speed set that is tailored for use at high speeds (e.g., 100 km/hr and above) and a low-speed set that is tailored for use at low speeds. Other embodiments use more than two sets. For example, at least one embodiment uses a first set for high-speeds, a second set for moderate or mid-range speeds, and a third set for low speeds. Another possibility is that the trigger is bounded by some maximum and minimum values, which are signaled by the network. This allows the UE to independently select any value of mobility trigger parameter, which is within the signaled maximum and minimum values. Obviously in this scheme the UE has more freedom. It can be useful in case there is large variation of the UE speed whereby discrete sets of mobility trigger parameters signaled by the network are not adequate. However in order to ensure appropriate UE behavior in terms of choosing the mobility trigger parameters proper test cases would be required.

As mentioned above embodiments of the present invention includes selecting which set of mobility trigger parameters to use for performing mobility-based decisions, based on determining a mobile terminal's speed range (i.e., determining which range among two or more defined speed ranges the mobile terminal's estimated speed falls into).

Now an embodiment of the present invention will be described according to which two speed ranges are used a low speed range (e.g. <50 km/hr) and a high speed range. The above mentioned LONG (small signal hysteresis and long time hysteresis) and SHORT (large signal hysteresis and small time hysteresis) mobility trigger parameter sets are meant to be used at low and high UE speeds respectively. Let us consider that the UE detects that it is moving at high speed and upon this detection, the UE deactivates the LONG set of mobility triggers. This means it uses only the SHORT set of triggers for mobility decision (e.g. cell reselection). This is because the LONG set of triggers, as stated above, is to be used at low speed level. However, the UE may monitor as well triggers generated by the LONG set of mobility triggers, but since the LONG set is deactivated the UE is not taking them into account for mobility-based decisions when in high speed state.

Now consider the opposite case. The UE detects that it is moving at low speed and upon this detection the UE deactivates the SHORT set of mobility trigger. This means that the UE uses only the LONG set of mobility trigger parameters for mobility-based decisions (e.g. cell reselection). However it has been observed that there is no problem when the trigger parameters best suited for high speeds, the so-called SHORT set, is triggering cell changes when the UE is moving at low speeds. The reason is that the SHORT set of triggers does not easily cause cell changes, at low speeds, due to the high HO hysteresis value this set usually has. Therefore according to an alternative embodiment, upon detection of low speed, the UE may select to have both the SHORT set and the LONG set activated simultaneously and use both sets for mobility-based decisions.

In the example embodiment above it was described that depending upon the radio resource control (RRC) mode (idle or connected) either the UE or the network base station or both the UE and the network base station determined the UE speed range and selected appropriate set(s) of mobility trigger parameters. If the UE is in idle mode, where it does not have an active connection to the network, cell reselection decisions will be made by the UE. FIG. 2 is a schematic flow diagram of an embodiment of a method for mobility management performed in a UE. In a step 21 the mobile terminal maintains two or more sets of mobility trigger parameters, each set corresponding to a different speed range. Step 21 may involve that the UE receives these sets by means of signaling from the network and stores the sets in a temporary memory. In a further step 22, the UE determines its speed range which may relate to its current speed or tracked/historical speed as will be explained in greater detail below. In a step 23 the UE selects one or several sets of mobility trigger parameters to be used for mobility-based decisions based on the determined speed range of the UE. According to some embodiments the UE looks at its current or tracked/historical speed range and selects the corresponding set of mobility trigger parameters. However, as mentioned above, it is also possible that the UE selects several sets of mobility trigger parameters if e.g. a low speed range is determined in step 22.

FIG. 1 is a schematic block diagram of a UE 11 implementing an embodiment of the present invention. The UE includes radio transceiver circuits 13 and control/communication circuits 12, comprising one or more processing circuits 17. These circuits may be implemented in hardware, software or some combination thereof. At least functionally, the processing circuits include a speed range estimator 15 that is configured to estimate the speed range of the UE, and a mobility processor 16 that is configured to select a set of mobility trigger parameters based on the UE's speed range, and use the selected set for mobility processing, e.g., cell reselection decision making during idle-mode operation of the UE. The mobility processor 16 includes a maintaining unit 14 (e.g. a temporary storage/memory) adapted to maintain at least two sets of mobility trigger parameters. The person skilled in the art will appreciate that the different units shown in FIG. 1 may be implemented as physically separate units, or completely or partly integrated with each other. The speed range estimator may be adapted to detect multiple levels of UE speed e.g. low and high or more levels of speed (low (e.g. <50 km/hr), medium (e.g. between 50 km/hr and 120 km/hr) and high (e.g. >120 km/hr).

Figure 4:
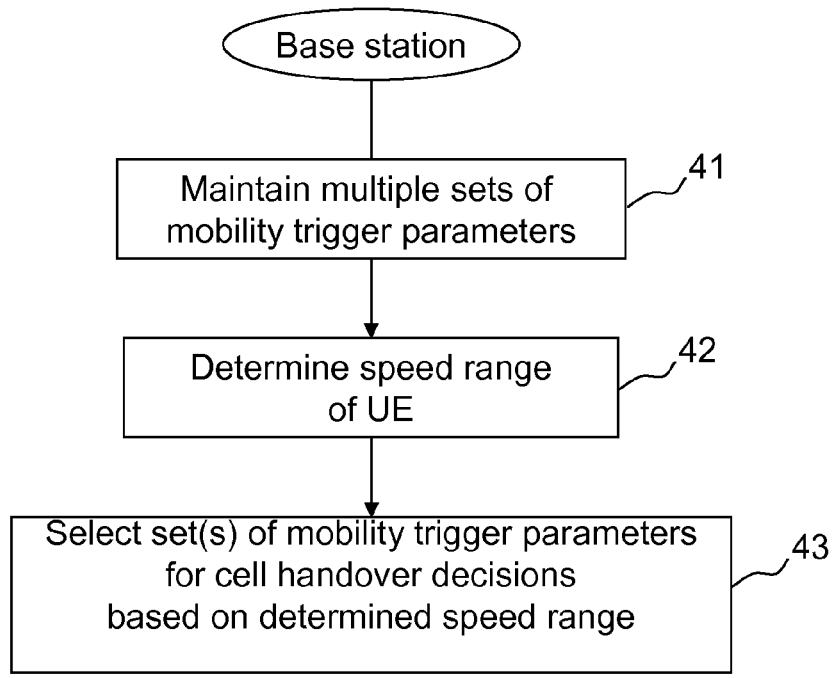
FIG. 4 is a flow diagram illustrating an embodiment in accordance with the present invention of a method for mobility management in a network base station.

If a UE is actively connected to a supporting wireless communication network, the cell handover decision is taken by the mobile's serving base station, based on the serving base station's mobility-based decision processing. FIG. 4 is a schematic flow diagram of an embodiment of a mobility management method performed in the base station in which the base station selects the appropriate set(s) of mobility trigger parameters. In a step 41 the base station maintains two or more sets of mobility trigger parameters, each set corresponding to a different UE speed range. In a step 42 the base station may determine the UE's speed, or at least determine which of a number of predefined speed ranges the UE speed falls into. The speed range determination may relate to the current speed of the UE or tracked/historical speed as will be explained in greater detail below. In a step 43 the serving base station chooses which set(s) of mobility trigger parameters to use for making the cell handover decision, based on the determined UE speed range. Typically this implies that the base station looks at the speed range (current or tracked/historical) of the UE and selects the corresponding set of mobility trigger parameters to use in making the cell handover decision. In connected mode the UE speed range can also be determined mutually by both the UE and the base station especially in case there is not sufficient uplink transmission. On the other hand the UE is required to continuously monitor downlink signals e.g. downlink pilot or reference signals, which are always transmitted. The base station can measure the UE speed whenever there is uplink transmission. Otherwise the base station can request the UE to report the UE speed or request the UE to continuously measure its speed when it is in connected mode. With the above in mind, it will be appreciated that in one embodiment, using the selected set(s) of mobility trigger parameters comprises a UE performing cell reselection processing. In another embodiment, using the selected set of mobility trigger parameters comprises a base station performing cell handover processing.

As for implementation, one embodiment of a base station 31 is schematically depicted in FIG. 3. The base station 31 includes radio transceiver circuits 33 and control/communication circuits 32, comprising one or more processing circuits 37. These circuits may be implemented in hardware, software or some combination thereof. At least functionally, the processing circuits include a speed range estimator 35 that is configured to estimate the speed range of the UE, and a mobility processor 36 that is configured to select a set of mobility trigger parameters based on the UE's speed range, and use the selected set for mobility processing, e.g. cell handover decision making during connected-mode operation of the UE. The mobility processor 36 includes a maintaining unit 34 (e.g. a temporary storage/memory) adapted to maintain at least two sets of mobility trigger parameters. The person skilled in the art will appreciate that the different units shown in FIG. 3 may be implemented as physically separate units, or completely or partly integrated with each other. The speed range estimator may be adapted to detect multiple levels of UE speed e.g. low and high or more levels of speed (low (e.g. <50 km/hr), medium (e.g. between 50 km/hr and 120 km/hr) and high (e.g. >120 km/hr).

For both the base station 31 and the UE 11, those skilled in the art will appreciate that at least some of the illustrated processing circuits 17, 37, including all or part of the speed range estimator 15, 35 and the mobility processor 16, 36, can be implemented in one or more microprocessor-based circuits. Additionally, or alternatively, all or part of the processing circuits are implemented using Application Specific Integrated Circuits (ASICs), which may include microprocessor cores, memory, etc., or using FPGA, other programmable devices, or other digital processing logic. In microprocessor-based embodiments the base station 31 and/or the mobile station 11 may include memory or another type of computer-readable medium, storing a computer program comprising program instructions. In such embodiments of the base station 31, the mobility management method is based on the execution of those stored program instructions by one or more microprocessors, DSPs, or the like. The same applies for microprocessor-based implementations on the UE side.

Irrespective of these lower-level implementation details, those skilled in the art will appreciate that, in one or more embodiments, a basic aspect of the invention presented herein is to make speed dependent mobility management decisions using the most suitable set(s) of mobility trigger parameters, out of two or more such sets. The selection of the most suitable set(s) of triggers is determined by detection of the mobile terminal's speed, which may be advantageously done on a simplified, speed range basis. Hence a base station determines which speed range the speed of a given UE falls into, or the UE makes that determination, and the most appropriate set(s) of mobility trigger parameters is/are selected for mobility decision processing.

Let us now consider specific embodiments pertaining to how the speed range of the UE may be determined, i.e. different alternatives for how to carry out steps 22 and 42 in FIGS. 2 and 4 respectively.

A first alternative for UE speed range determination uses speed detection based on variation of a measured signal. Simplified, rough speed estimation may be used, based on the UE's comparative evaluation of received signal strengths and/or qualities, for serving and non-serving cells that are candidates for reselection. There are two main approaches of detecting speed based on variation of the measured signal:

Difference between consecutive measured signal samples,
Rate of change of the measured signal.

Let us first consider the approach using difference between consecutive measured signal samples. According to this approach the UE detects its speed by measuring the difference between the consecutive values of the measured signal (e.g. consecutive RSRP or consecutive RSRQ values in LTE or CPICH RSCP or CPICH Ec/No in UTRAN or similar quantities in other systems). In the above described embodiment using a predetermined high speed range and low speed range, the absolute difference between the consecutive measured values or samples of the measurement quantity being higher than a predetermined threshold, may be interpreted as an indication that the UE is moving at high speed. Otherwise the UE is considered to be moving at low speed. For example if the measured quantity is RSRP then the higher speed is indicated provided:

$$|RSRP_n - RSRP_{n-1}| > Dlt \qquad (F1)$$

Where, Dlt is the threshold, which can be UE implementation specific, pre-defined standardized values or signaled to the UE by a network node.

If condition (F1) is fulfilled for N consecutive measurement instants the UE deactivates the LONG set of mobility triggers. Hence the mobility trigger is selected in response to the speed detection according to the condition (F1). According to the condition (F1) the speed detection is based on the RSRP measured from one cell e.g. serving cell. A further refinement of this approach is that the detection of speed is based on statistics rather than one or few samples. For instance the UE may obtain measurement results using (F1) from several cells and uses a suitable function or expression to determine the speed based on the aggregated values (e.g. weighted mean of the measured statistics).

Multiple thresholds would be needed in case multiple sets of speed ranges (e.g. low, medium and high) are to be detected. The thresholds can be UE implementation specific, pre-defined values in a standard or signaled to the UE.

Let us now consider the approach using rate of change of the measured signal. According to this approach the speed is detected based on the rate of change of signal quality e.g. change in RSRP over certain time period ($\Delta t$). Hence if the rate of change of the measured signal quality (e.g. RSRP) is above a predetermined threshold ($\gamma$) then this is an indication that the UE is moving at high speed as expressed in (F2). Otherwise the UE is considered to be moving at low speed.

$$\frac{|RSRP_n - RSRP_{n-1}|}{\Delta t} > \gamma \quad \text{(F2)}$$

Where the threshold ($\gamma$) and measurement sampling window ($\Delta t$) can be UE implementation specific, pre-defined values in a standard or signaled to the UE. A difference compared to the previous approach expressed by (F1) is that in (F2), the measured samples don't have to be consecutive. A further refinement of this approach is also that the detection of speed is based on statistics rather than one or few samples. For instance the UE may obtain measurement results using (F2) from several cells and uses a suitable function or expression to determine the speed based on the aggregated values (e.g. weighted mean of the measured statistics).

Multiple thresholds would also be needed in case multiple sets of speed levels (e.g. low, medium and high) are to be detected. The thresholds can be UE implementation specific, pre-defined standardized values, or signaled to the UE by the network.

Detection of high speeds is easier than the detection of low speeds. In addition, such detection is done quite fast at high speed, e.g. over 1 or 2 or N measurement periods. Typical values for measurement periods are 40, 50, 66.67 msec in connected mode and 0.64, 1.28 seconds in idle mode. In the example embodiment using a high speed range and a low speed range, upon detection of high speed, the UE may continue checking speed using (F1) or (F2) depending upon which approach is used. When (F1) or (F2) is not satisfied for N (N≥1) consecutive times, the UE may go to the low speed state again. The parameter N can be UE implementation specific, pre-defined values in the standard, or signaled to the UE by the network. Yet another possibility is that the UE always performs speed detection unless the speed detection is disabled by the network. The mobility trigger parameters to be used for mobility-based decisions are selected based on the determined speed range of the UE.

A second alternative for UE speed range determination is based on counting of homogenous triggers. There are two variants which are further described:
 counting of consecutive homogeneous triggers
 counting of majority of homogeneous triggers.

In case of counting of consecutive homogenous triggers in the above described embodiment using a high speed range and a low speed range, it can be determined whether or not the UE is in the high speed state by counting how many consecutive times the "SHORT" set triggers cell changes. In case the UE detects M consecutive cell changes triggered by the "SHORT" trigger, then the UE considers this as a high speed state case. The UE then deactivates the "LONG" set of mobility triggers. Similarly if the UE detects M consecutive cell changes triggered by the "LONG" trigger, then the UE considers this as a low speed state case. After having determined that the UE is in the high speed state, the UE continues monitoring which set of triggers has generated cell changes.

If P consecutive cell changes are triggered by the "LONG" set of mobility triggers, then it is determined that the UE should transition into the low speed state.

It should be noted that the fact that a set of mobility trigger parameters triggers a cell change does not have to lead to an actual cell change taking place since the set triggering a cell change may not be activated in the sense that it is used for making mobility-based decisions. Nevertheless even though a set is not activated and able to influence mobility-based decisions it is still possible to monitor cell changes triggered by that set and use this monitoring information in the determination of the speed range of the UE.

In case of counting of majority homogenous triggers in the above described embodiment using a high speed range and a low speed range, it can be determined that the UE is in the high speed state if at least L1 out of J1 cell changes are triggered by the 'SHORT' trigger over the time period T0. In this case UE use disables the 'LONG' trigger. Similarly the UE may detect low speed provided at least L2 out of J2 cell changes are triggered by the 'LONG' trigger over the time period T1.

The above stated parameters in both of the described variants including: M, P, T0, T1, L1, J1, L2 and J2 can be UE implementation specific, pre-defined values in the standard or signaled to the UE by the network.

The above speed range determination methods based on counting triggered cell changes can also be extended to the case of more than two sets of mobility trigger parameters e.g. SHORT, MEDIUM and LONG triggers.

A third alternative for UE speed range determination is based on opportunistic speed determination. According to this alternative the UE measures the speed using more sophisticated means whenever it has the possibility to do so. This is referred to as 'opportunistic means or occasions', which will be described further below. After the speed detection the UE may select an appropriate set of mobility triggers e.g. at higher speed it may use the SHORT set and at low speed it may use the LONG set for mobility evaluation (e.g. cell reselection). As mentioned above it is also possible that, the UE uses several sets for making cell changes e.g. at low speeds.

In DRX (Discontinuous Reception) mode and in particular in idle mode where long DRX cycle (e.g. 1.28 second) is used, it is not battery-consumption wise efficient for the UE to estimate the speed by using classical methods e.g. Doppler frequency. Instead the UE can measure or track the speed occasionally whenever there is an opportunity to do so. Examples of opportunistic speed determination occasions or mechanisms are:
 during the time when the UE performs cell reselection
   during the time when the UE performs tracking area update or similar updates (e.g. location area update, registration area update etc)
   during the time when the UE has to read system information for any reason (e.g. change in broadcast information)
   during the time when the UE has to respond to paging
   during the time when the UE receiver is active for accessing any service e.g. when playing music, accessing other services in parallel such as broadcast TV.

The last case applies to the UE which offers other services such as music, games etc, which are now common on most terminals. The energy for all of these services is provided by the common battery.

It is thus possible that the UE makes rough (e.g. quick, low power) speed measurements as needed, or according to some schedule, but supplants or augments those measurements with more accurate speed determinations, when it is opportunistic to make such determinations.

The basic concept of measuring speed when the UE receiver is active for some other reason is known in the prior art. However, according to embodiments of the present invention one or several appropriate sets of mobility trigger parameters is/are selected for mobility evaluation at occasions when the UE is able to determine its speed in an opportunistic manner.

A fourth alternative for UE speed range determination is based on GNSS speed determination. According to this alternative the UE measures the speed using a global navigational satellite system (GNSS) receiver e.g. A-GPS receiver. After the speed detection based on GNSS (e.g. A-GPS) the UE selects which set(s) of mobility trigger parameters to use based on the detected speed. This alternative of speed range determination requires that UE is equipped with an appropriate GNSS receiver.

A fifth alternative for UE speed range determination is based on composite speed determination. According to this alternative two or more different speed range determination alternatives are used by the UE to detect the speed. Once the speed range is determined the UE will select the most appropriate set(s) of mobility trigger parameters based on the determined speed range. Hence this fifth alternative is a combination of all previous speed range determination alternatives described above. The motivation of this embodiment is to improve the speed determination by using an alternative which is most suitable at a time.

There are different ways according to which the speed can be determined using more than one type of speed range determination method:
  tandem speed range determination
  parallel speed range determination
  weighted or aggregated speed range determination.

By tandem speed determination is herein meant that only one speed determination alternative is used at a time, but the UE is able to use more than one means to determine the speed range. Assume for instance that the UE is able to use 3 different alternatives for speed range determination. Let us consider three time durations T3, T4 and T5; all these times are in series i.e. T4 starts after T3 ends and T5 starts after T4 ends. During T3 the UE uses the speed range determination alternative based on rate of change of signaling quality described above (the second variant of the first alternative). The UE then selects which set(s) of mobility trigger parameters to use for performing mobility evaluation and for making the mobility related decisions based on the speed range determination during T3. During T4 the UE uses the speed range determination alternative based on the counting of consecutive homogeneous triggers, hence the above mentioned second alternative for UE speed range determination applies. Thereafter the UE selects which set(s) of mobility trigger parameters to use for performing mobility evaluation and making the mobility related decisions based on the speed range determination during T4. During T5 the UE uses the method based on the opportunistic speed range determination. Assume for example that the UE has to open its receiver to read system information either due to a change in the system information or due to performing cell reselection. The UE can then use this as an opportunity to determine the UE speed using Doppler estimation. Therefore the speed range determination alternative used during T5 is the above mentioned third alternative. Based on the determined UE speed T5 the UE selects which set(s) of mobility trigger parameters to use for performing mobility evaluation and making the mobility related decisions. At a given time the UE may use the particular speed range determination alternative, which is most suited. For example the alternative based on Doppler can be used when the UE receiver is active. Another possibility is that the UE chooses speed range determination alternative based on pre-defined rules specified in the applicable standard. The maximum time used for determining the speed range can also be specified or signaled to the UE.

By parallel speed range determination is herein meant that more than one speed range determination alternative may be used by the UE at a time. Then the final decision about the speed range is made based on a rule e.g. majority rule. Assume for instance that the UE is able to use 3 different alternatives for determining UE speed range. Let us consider time duration T6. During T6 the UE is capable of determining speed range based on:
  rate of change of signal quality (first alternative)
  Counting homogeneous triggers (second alternative)
  Opportunistic speed range determination (third alternative)

Let us assume that during T6 according to the first alternative for UE speed range determination indicates low speed. However during the same time window (T6), the second alternative and third alternative for UE speed range determination indicate high speed. Hence based on the majority rule the UE determines the speed range to be the high speed range and selects the appropriate set of trigger parameters i.e. the SHORT set of trigger parameters in this example.

When weighted or aggregated speed range determination is used the UE uses more than one speed range determination alternative to determine the speed range. However the speed range is determined from an expression which is a function of all individual indications of speed range according to the different speed range determination alternatives (e.g. the above described speed range determination alternatives). This is called speed range determination based on an aggregated means or weighted means. The aggregate speed (Va) is obtained by defining a suitable function. A general formula is expressed in (F3):

$$V_a = F\{\alpha_1 V_1, \alpha_2 V_2, \ldots \alpha_M V_M\} \qquad (F3)$$

where: $\alpha_i$ are weighted factors for speed range determined using different alternatives for different speed range determination (V1 ... VM). The UE may e.g. determined high speed if Va is above a threshold $\mu$ as expressed in (F4):

$$V_a = F\{\alpha_1 V_1, \alpha_2 V_2, \ldots \alpha_M V_M\} \geq \mu \qquad (F4)$$

Based on (F3) the UE may e.g. select to use the 'SHORT' set of mobility trigger parameters in case of a determined high speed range or to use the 'LONG' set of mobility trigger parameters in case of a determined low speed range. The function in (F3) is a general expression. In particular this can be a weighted mean such as arithmetic or geometric mean of all speed ranges according to different speed range determination alternatives. The parameters such as the weights $\alpha_i$, threshold $\mu$ and the time window over which speed is determined T7 can be UE implementation specific, pre-defined values in the standard or signaled to the UE by the network.

Thus, by looking at different speed determinations, which may be independent or, in some cases, supplementary, a more reliable determination of UE speed range can be made, thus allowing a more reliable selection of the set(s) of mobility trigger parameters to use.

The above described speed range determination alternatives mainly focused on the situation when the UE is in idle mode and the UE itself determines its speed range. However, in case the UE is in connected mode the serving network base station may determine the speed range of the UE or the UE may determine its speed range and inform the network base station of the determined speed range. Thus the above described speed range determination alternatives are not limited to only idle mode but rather can be used when the UE is in connected state or other quasi-active state.

The step of determining which mobility parameter set to use for mobility-based decision making can be based simply on making a current estimate of a mobile terminal's speed range and selecting the corresponding set of mobility trigger parameters. On the other hand, more sophisticated determinations can be made. For example, once it has been determined that the mobile terminal's speed is in the high-speed range, it may be required to see the next N determinations indicate the low-speed range, before switching from use of the high-speed set of mobility parameters to the low-speed set of mobility trigger parameters. This mechanism was described above in connection with the second alternative for speed range determination but it may also be combined with other speed range determination alternatives. The same logic may be used for staying with the low-speed set of mobility trigger parameters, and it should be understood that N can be some integer number of consecutive values, or N of M can be used, such as requiring the last 3 of 5 speed range determinations to agree, etc. This can be understood as a form of decision feedback. In another example, the UE may be configured to determine which speed range was selected for the last N cell reselection decisions (out of N decisions or out of M decisions, where M is greater than N), and continue using that selection until a new trend is observed in its ongoing speed range determinations. Similar processing can, of course, be implemented in the network base station. Further extensions beyond the tracked/history of speed range determination can be used. For example, a running (filtered) value can be used, based on ongoing (e.g., periodic) speed range determinations.

When the UE is in connected mode there are several different possibilities for how involved the network base station and the UE are in the procedure of selecting one or several appropriate sets of mobility trigger parameters based on speed range determination. The network base station may for instance configure the UE with two (or more) sets of mobility triggers for performing handover evaluation. Then based on speed range determination according to one of the principles described above, the network base station can decide to enable the most appropriate set (or sets) at a given time. It is then possible that the UE only informs the network base station of triggers caused by the enabled set (or sets) of mobility trigger parameters. Alternatively the selection of set(s) of mobility trigger parameters can also be done by the UE based on a pre-defined rule. Yet another alternative is that the network can select a trigger event, based on the most appropriate set of mobility trigger parameters when sending the handover command. Thus the UE may monitor all sets of mobility trigger parameters and report all triggers to the network base station, but the network base station may then choose not to act on certain triggers in view of the determined speed range of the UE. In this way, call dropping can be reduced. Furthermore, since UE is in connected mode it is also possible for the network to determine the UE speed and configure the UE with the most appropriate set or sets of mobility trigger parameters or select a trigger event based on the most appropriate trigger when sending the handover command.

The invention claimed is:
1. A method for mobility management in a user equipment for use in a cellular communications system, comprising:
maintaining at least two sets of mobility trigger parameters, each set of mobility trigger parameters corresponding to a predetermined user equipment speed range;
determining a speed range of the user equipment by monitoring the number of times that cell changes are triggered by the at least two sets of mobility trigger parameters; and
selecting, based on the determined speed range of the user equipment, at least one of the maintained sets of mobility trigger parameters to be used for performing mobility-based decisions.

2. The method of claim 1, wherein the selecting is performed such that only one of the maintained sets of mobility trigger parameters is selected, the selected set corresponding to the determined speed range of the user equipment.

3. The method of claim 1, further comprising:
wherein the maintaining includes maintaining a set of high speed mobility trigger parameters corresponding to a user equipment speed above a predetermined high speed threshold;
wherein the determining includes determining if a speed of the user equipment is above or below the high speed threshold; and
wherein the selecting includes:
selecting only the set of high speed mobility trigger parameters responsive to the speed of the user equipment being determined to be above the high speed threshold;
otherwise selecting a plurality of the maintained sets of mobility trigger parameters responsive to the speed of the user equipment being determined to be below the high speed threshold.

4. The method of claim 1, wherein the determining includes comparing a difference between consecutive values of a measured reference signal to at least one predetermined threshold value associated with at least one of the predetermined user equipment speed ranges.

5. The method of claim 1, wherein the determining includes comparing a rate of change of a measured signal quality of a reference signal to at least one predetermined threshold value associated with at least one of the predetermined user equipment speed ranges.

6. The method of claim 1, wherein
at least one set of mobility trigger parameters to be used for performing mobility-based decisions is selected based on the number of monitored times that cell changes are triggered by the different sets of mobility trigger parameters.

7. The method of claim 6, wherein the determining comprises:
determining that the speed range is a first predetermined user equipment speed range if the monitoring of the number of times cell changes are triggered shows that a first set of mobility trigger parameters corresponding to the first predetermined user equipment speed range has triggered either a predefined number of consecutive cell changes or has triggered a predefined portion of a total number of cell changes over a time period.

8. The method of claim 1, wherein determining a speed range of the user equipment comprises using a global navigational satellite system receiver to determine the speed range of the user equipment.

9. The method of claim 1, wherein the at least two sets of mobility trigger parameters include parameters for cell reselection to be used when the user equipment is in idle mode, parameters for handover to be used when the user equipment is in connected mode, or a combination thereof.

10. A user equipment adapted for use in a cellular communications system, comprising:
  a maintaining unit for maintaining at least two sets of mobility trigger parameters, each set of mobility trigger parameters corresponding to a predetermined user equipment speed range;
  a speed range estimator adapted to determine a speed range of the user equipment by monitoring the number of times that cell changes are triggered by the at least two sets of mobility trigger parameters; and
  a mobility processor adapted to select, based on the determined speed range of the user equipment, at least one of the maintained sets of mobility trigger parameters to be used for performing mobility-based decision.

11. The user equipment of claim 10, wherein the mobility processor is adapted to select only one of the maintained sets of mobility trigger parameters, the selected set corresponding to the determined speed range of the user equipment.

12. The user equipment of claim 10, further comprising:
  wherein the maintaining unit maintains a set of high speed mobility trigger parameters corresponding to a user equipment speed above a predetermined high speed threshold;
  wherein the speed range estimator is adapted to determine if a speed of the user equipment is above or below the high speed threshold; and
  wherein the mobility processor is configured to:
    select only the set of high speed mobility trigger parameters responsive to the user equipment being determined to be above the high speed threshold;
    otherwise select a plurality of the maintained sets of mobility trigger parameters responsive to the speed of the user equipment being determined to be below the high speed threshold.

13. The user equipment of claim 10, wherein the speed range estimator is adapted to compare a difference between consecutive values of a measured reference signal to at least one predetermined threshold value associated with at least one of the predetermined user equipment speed ranges.

14. The user equipment of claim 10, wherein the speed range estimator is adapted to compare a rate of change of a measured signal quality of a reference signal to at least one predetermined threshold value associated with at least one of the predetermined user equipment speed ranges.

15. The user equipment of claim 10, wherein the speed range estimator is configured to determine that the speed range is a first predetermined user equipment speed range if the monitoring of the number of times cell changes are triggered shows that a first set of mobility trigger parameters corresponding to the first predetermined user equipment speed range has triggered either a predefined number of consecutive cell changes or has triggered a predefined portion of a total number of cell changes over a time period.

16. The user equipment of claim 10, wherein the speed range estimator is configured to use a global navigational satellite system receiver to determine the speed range of the user equipment.

17. The user equipment of claim 10, wherein the at least two sets of mobility trigger parameters include parameters for cell reselection to be used when the user equipment is in idle mode, parameters for handover to be used when the user equipment is in connected mode, or a combination thereof.

18. A method for mobility management in a network base station of a cellular communications system, wherein the network base station is acting as a serving base station of a user equipment, the method comprising:
  maintaining at least two sets of mobility trigger parameters, each set of mobility trigger parameters corresponding to a predetermined user equipment speed range;
  determining a speed range of the user equipment by monitoring the number of times that cell changes are triggered by the at least two sets of mobility trigger parameters; and
  selecting, based on the determined speed range of the user equipment, at least one of the maintained sets of mobility trigger parameters to be used for performing cell handover decisions.

19. The method of claim 18, further comprising:
  configuring the user equipment with the at least two sets of mobility trigger parameters; and
  activating the selected at least one set of mobility trigger parameters in the user equipment using control signaling.

20. The method of claim 18, further comprising:
  configuring the user equipment with the at least two sets of mobility trigger parameters;
  receiving trigger monitoring information from the user equipment regarding any trigger events caused by trigger parameters of the at least two sets of mobility trigger parameters; and
  choosing a trigger event based on the determined speed range of the user equipment.

21. A network base station adapted for use in a cellular communications system and for acting as a serving base station of a user equipment, comprising:
  a maintaining unit for maintaining at least two sets of mobility trigger parameters, each set of mobility trigger parameters corresponding to a predetermined user equipment speed range;
  a speed range estimator adapted to determine a speed range of the user equipment by monitoring the number of times that cell changes are triggered by the at least two sets of mobility trigger parameters; and
  a mobility processor adapted to select, based on the determined speed range of the user equipment, at least one of the maintained sets of mobility trigger parameters to be used for performing cell handover decisions.

22. The network base station of claim 21, wherein the network base station is configured to:
  configure the user equipment with the at least two sets of mobility trigger parameters; and
  activate the selected at least one set of mobility trigger parameters in the user equipment using control signaling.

23. The network base station of claim 21, wherein the network base station is configured to:
  configure the user equipment with the at least two sets of mobility trigger parameters;
  receive trigger monitoring information from the user equipment regarding any trigger events caused by trigger parameters of the at least two sets of mobility trigger parameters; and
  choose a trigger event based on the determined speed range of the user equipment.

* * * * *